United States Patent [19]

Saastamoinen

[11] Patent Number: 5,707,493
[45] Date of Patent: Jan. 13, 1998

[54] TEMPERATURE-ACTIVATED POLYSILICIC ACIDS IN PAPER PRODUCTION

[75] Inventor: Sakari Saastamoinen, Taavetti, Finland

[73] Assignee: J.M. Huber Corporation, Edison, N.J.

[21] Appl. No.: 592,950

[22] Filed: Jan. 29, 1996

Related U.S. Application Data

[62] Division of Ser. No. 375,886, Jan. 20, 1995, Pat. No. 5,571,494.

[51] Int. Cl.$^6$ ................................................ D21H 21/10
[52] U.S. Cl. ......................... 162/164.1; 162/168.3; 162/175; 162/178; 162/181.1; 162/181.6; 162/183
[58] Field of Search ............................ 162/181.6, 164.1, 162/168.2, 168.3, 175, 178, 183, 181.1, 164.3, 164.6

[56] References Cited

U.S. PATENT DOCUMENTS

| | | |
|---|---|---|
| 3,967,563 | 7/1976 | Wason . |
| 3,988,162 | 10/1976 | Wason . |
| 4,001,379 | 1/1977 | Turk et al. . |
| 4,045,240 | 8/1977 | Wason et al. . |
| 4,067,746 | 1/1978 | Wason et al. . |
| 4,111,843 | 9/1978 | Feistel et al. . |
| 4,191,742 | 3/1980 | Wason et al. . |
| 4,243,428 | 1/1981 | Donnet et al. . |
| 4,457,900 | 7/1984 | Steenken . |
| 4,495,167 | 1/1985 | Nauroth et al. . |
| 4,581,217 | 4/1986 | Shinpo et al. . |
| 4,590,052 | 5/1986 | Chevallier et al. . |
| 4,640,807 | 2/1987 | Afghan et al. . |
| 4,645,567 | 2/1987 | Hou et al. . |
| 4,681,750 | 7/1987 | Johnson et al. . |
| 4,708,859 | 11/1987 | Chevallier . |
| 4,755,259 | 7/1988 | Larsson . |
| 4,790,486 | 12/1988 | Eimaeda et al. . |
| 4,842,838 | 6/1989 | Chevallier . |
| 4,857,289 | 8/1989 | Nauroth et al. . |
| 4,946,557 | 8/1990 | Svending . |
| 4,950,362 | 8/1990 | Steinau et al. . |
| 4,954,220 | 9/1990 | Rushmere . |
| 4,954,327 | 9/1990 | Blount . |
| 4,969,976 | 11/1990 | Reed . |
| 4,992,251 | 2/1991 | Aldcroft et al. . |
| 5,034,207 | 7/1991 | Kerner et al. . |
| 5,066,420 | 11/1991 | Chevallier . |
| 5,100,581 | 3/1992 | Watanabe et al. . |
| 5,110,574 | 5/1992 | Reinhardt et al. . |
| 5,124,143 | 6/1992 | Muhlemann et al. . |
| 5,127,994 | 7/1992 | Johansson ................ 162/181.5 |
| 5,225,041 | 7/1993 | Richard et al. . |
| 5,225,177 | 7/1993 | Wason et al. . |
| 5,231,066 | 7/1993 | Rekers et al. . |
| 5,234,673 | 8/1993 | McGill et al. . |
| 5,236,623 | 8/1993 | Chevallier . |
| 5,277,764 | 1/1994 | Johansson et al. ............ 162/181.6 |
| 5,368,833 | 11/1994 | Johansson et al. . |
| 5,419,888 | 5/1995 | McGill et al. . |
| 5,447,604 | 9/1995 | Johansson et al. . |

FOREIGN PATENT DOCUMENTS

| | | |
|---|---|---|
| 0041056 | 12/1986 | European Pat. Off. . |
| 0 348 366 B1 | 12/1989 | European Pat. Off. . |
| 0 500 770 | 9/1992 | European Pat. Off. . |
| 86/05826 | 10/1986 | WIPO . |
| 91/07543 | 5/1991 | WIPO . |
| 94/05596 | 3/1994 | WIPO . |
| 95/23021 | 8/1995 | WIPO . |

OTHER PUBLICATIONS

Moffett, R.H., On–Site Production of a Silica Based Microparticulate Retention and Drainage Aid, 1994 Papermakers Conference.

Sears, George W. Jr., Determination of Specific Surface Area of Colloidal Silica by Titration with Sodium Hydroxide, Analytical Chemistry, vol. 28, No. 12, 1981–3, (1956).

Iler, Ralph K., The Chemistry of Silica, pp. 10–11, 172–176, 225–234, John Wiley and Sons, New York, 1979.

*Primary Examiner*—Peter Chin

[57] ABSTRACT

A temperature-activated polysilicic acid is prepared by heating an acidified aqueous alkali metal silicate. The temperature-activated polysilicic acid is used in the production of paper for improvement of retention and water removal.

32 Claims, No Drawings

TEMPERATURE-ACTIVATED POLYSILICIC ACIDS IN PAPER PRODUCTION

This application is a division of application Ser. No. 08/375,886 filed Jan. 20, 1995 now U.S. Pat. No. 5,571,494.

TECHNICAL FIELD

The present invention relates to a temperature-activated polysilicic acid prepared by heating an acidified aqueous alkali metal silicate. The present invention also relates to a process for the production of paper utilizing the temperature-activated polysilicic acid for improvement of retention and water removal.

BACKGROUND OF THE INVENTION

During the commercial production of paper, a uniform and continuous stream of a dilute water suspension comprising pulp fibers and other additives are allowed to flow readily through a narrow slot onto a traveling wire mesh. Most of the water drains rapidly through the wire mesh as it moves over a series of table rolls and suction boxes which support the wire and remove water from the forming sheet. As more water is drawn from the wet sheet, the consistency of the sheet gradually increases to about 20% at which point the paper sheet is strong enough to be transferred to a porous fabric blanket where it is pressed and looses water. Most of the remaining water, more than half the dry weight of the sheet, is evaporated out of the paper leaving about 5% to 8% moisture in the paper to minimize dimensional changes which occur as the paper establishes equilibrium with the relative humidity of the air in the production plant.

The addition of various chemicals to improve the properties of paper have been described in the prior art. For example, U.S. Pat. No. 4,954,220 to Rushmere relates to the use of anionic polysilicate microgels in combination with an organic polymer to flocculate pulp and papers fines in a papermaking operation. The polysilicate microgels are formed by the partial gelation of an alkali metal silicate or a polysilicate such as sodium polysilicate. The microgels are referred to as active silica in contrast to commercial colloidal silica and consist of aggregates of very small particles, e.g., 1 nanometer, and form three-dimensional networks. The microgels are described as having very high surface areas and are used in the papermaking process in conjunction with cationic polymers. In the section of the patent under "Detailed Description of the Invention", reference is made to the description of active silicas in the book "The Chemistry of Silica" published in 1979 by R. K. Iler as providing a disclosure of active silica microgels which can be used in the patented invention. The patent then sets forth a series of alternative methods by which polysilicate microgels may be prepared, including: 1) aqueous solutions of alkali metal silicates which have been acidified by acid exchange resins; 2) inorganic and organic acid aqueous solutions of alkali metal silicates which have been acidified by acids, salts and gases; 3) aqueous solutions of alkali metal silicates to which alkali metal salts of amphoteric metal acids have been added; and 4) alkali metal silicates to which certain organic compounds have been added. The patent then concludes in column 3, lines 50–55 that the simplest and most economic methods for the preparation of polysilicate microgels are products produced by acidification of sodium polysilicate solutions with a common mineral acid or addition of a gel initiator such as alum, sodium borate or sodium aluminate to a sodium polysilicate solution.

EKA Nobel PCT Published Application WO-90/107543 discloses a process for the production of paper in which three components are added to the paper suspension, a cationic starch, a cationic polyacrylamide, and a polymeric silicic acid, to improve retention and water removal in paper production. This PCT application discloses that the polymeric silicic acid is the same product as disclosed in Swedish Patent Application No. 8801951-8, which product has a very high specific surface area in the range of 1100 to 1700 $m^2/g$, and can be prepared by acidification of an alkali metal silicate such as sodium waterglass, the acidification being conducted by use of a mineral acid such as sulfuric acid or acid ion exchangers. In Example 1 on page 7, the polymeric silicic acid was prepared from waterglass which was diluted with water to an $SiO_2$ content of 5% by weight, after which the aqueous solution was ion exchanged with ion exchange resin Amberlite IR-120 to a pH of 2.3.

EKA European Patent Application No. 041056, directed to a paper making process, is disclosed in column 1 of the EKA Nobel published PCT application. This published application discloses a papermaking process which uses a binder of colloidal silicic acid and cationic starch added to the stock for improving the paper or retention of the stock components. Colloidal silicic acid is described, for example at page 7, as being a known material made by reacting waterglass with sulfuric acid by known procedures to provide a silica having molecular weights up to about 100,000. However, the patent states that this product is unstable and then points out at page 8 that by the invention disclosed in the European Patent Application, superior results are obtained through use with the cationic starch, of a colloidal silicic acid in the form of a sol, wherein the colloidal silicic acid in the sol will have a surface area of from 50–1000 $m^2/g$ and preferably 200–1000 $m^2/g$. The publication states that such silicic acid sols are available from various sources including Nalco, DuPont and EKA.

At page 20, Example IV, there is a specific description for producing a colloidal silicic acid component wherein 100 ml of waterglass were diluted with 160 milliliters of water and slowly fed into 130 milliliters of 10% sulfuric acid under vigorous agitation. When all the waterglass had been added, the pH was 2.7 and the $SiO_2$ content was 8% by weight. This acid sol was diluted to 2% $SiO_2$ by weight, added to an English China Clay grade C followed by addition of 2% cationic starch solution. These mixtures were then added to the paper.

Finnish Application No. 68283 discloses a two-component system used in the paper making process. The system comprises a cationic starch and a colloidal silica sol. This system is intended for improving retention and strength properties of the paper product. However, this two-component system is not commercially attractive due to the high price of the colloidal silica sol.

Finnish Application No. 894362 proposes a two component system in which colloidal silica sol is replaced with a certain anionic polysilicate microgel, which is prepared by a partial gelation of an alkali metal silicate by adding certain initiators to an aqueous solution of the alkali metal silicate.

None of these prior publications recognize that a temperature-activated polysilicic acid prepared by heating an acidified aqueous alkali metal silicate has improved properties as a retention agent in paper production. Further, none of these publications disclose a process for the production of paper utilizing a temperature-activated silicate for improvement of retention and water removal.

The present invention provides a novel temperature-activated polysilicic acid prepared by heating an acidified aqueous alkali metal silicate. Use of the novel temperature-activated silicate in the paper production process represents a significant improvement over the prior art for the following reasons: 1. They improve the mechanical properties of the finished paper; 2. They improve the recovery of fines and colloids from the water cycle; 3. They improve filterability; 4. They improve grammage and ash retention, i.e., filler retention; and 5. They are economical and easy to use.

SUMMARY OF THE INVENTION

The present invention provides a novel temperature-activated polysilicic acid agent prepared by heating an acidified aqueous alkali metal silicate.

Another aspect of the present invention relates to a process for the production of paper comprising the steps of:

adding components comprising a temperature-activated polysilicic acid and a cationic polymer to an aqueous fiber pulp suspension; and, carrying out sheet forming and water removal.

The present invention further provides a method for improving retention in a papermaking process wherein a temperature-activated polysilicic acid is added to an aqueous fiber pulp suspension.

Modifications are possible within the scope of this invention.

DESCRIPTION OF THE INVENTION

This invention will be described in detail with reference to the preferred embodiments and further illustrated by the examples provided.

The present invention relates to a temperature-activated polysilicic acid prepared by heating an acidified aqueous alkali metal silicate. Use of this novel temperature-activated polysilicic acid in a papermaking process results in the production of paper having superior properties. The present invention is based, in part, on the inventor's unexpected discovery of a temperature-activated polysilicic acid prepared by heating an acidified aqueous alkali metal silicate. The alkali metal silicate can be acidified to a broad pH range, from about 0 to 5, and more preferably to a pH range from about 0 to 2. Generally, when the alkali metal silicate is acidified to a pH near or below the isoelectric point of the alkali metal silicate, i.e., about 2.0, the polysilicic acid no longer functions well as a retention aid in the paper production process. It should therefore be appreciated that the present invention is also based on the inventor's surprising discovery that when an aqueous alkali metal silicate is acidified to a pH near or below the isoelectric point of the alkali metal silicate and is then heated for varying time periods to produce a temperature-activated polysilicic acid, the temperature-activated polysilicic acid greatly improves the papermaking process by producing paper with superior fiber and ash retention levels. Moreover, the temperature-activated polysilicic acid of the present invention has increased adherence efficiency over prior art agents. Thus, the temperature-activated polysilicic acids of the present invention combine and adhere strongly with only one cationic polymer. This eliminates the need to use two or more cationic polymers as in many of the prior art systems.

The temperature-activated polysilicic acid used in the present invention has a very high surface area of approximately 1350–1600 $m^2/g$. The given specific surface area is measured by the titration method of G. W. Sears, Anal. Chem. 28, (1956), p. 1981. The temperature-activated polysilicic acid of the present invention is prepared by acidification of an alkali metal silicate, such as potassium or sodium silicate, preferably sodium silicate, followed by heating. Potassium and sodium silicate are available with varying molar ratios of $SiO_2$ to $Na_2O$ or $K_2O$ and the molar ratio is usually within the range of from 1.5:1 to 4.5:1, preferably 3.3:1, and the alkali metal silicate usually has an original pH around 13. Waterglass is especially preferred.

Mineral acids, such as sulfuric acid, hydrochloric acid and phosphoric acid are used to acidify the aqueous alkali metal silicate. The acidification is carried out to a pH within the range of from about 0 to 5 and more preferably to a pH within the range of from about 0 to 2. The aqueous alkali metal silicate may be acidified by slow addition of a diluted alkali metal silicate solution into a mineral acid. Acidification with an ion exchange agent or organic acids, such as acetic acid, may also be used.

The $SiO_2$ concentration in the aqueous alkali metal silicate solution to be heated is preferably about 1–20 weight percent. When necessary, the temperature-activated polysilicic acid agent obtained after heating is diluted with water to a desired concentration.

The aqueous alkali metal silicate solution is heated to a temperature of about 30°–250° C. and more preferably to a temperature of about 60°–90° C., for a period of about 1–120 hours, more preferably about 1–20 hours. The heating may be done by using the secondary temperature of a paper mill in a tank adjacent the papermaking machinery. The heating may also be done under pressure necessary to achieve the desired temperature.

After heating, the resulting temperature-activated polysilicic acid may be mixed at room temperature and diluted, more preferably mixed at room temperature for 72 hours and diluted to 0.15% $SiO_2$.

Another aspect of the present invention relates to a process for the production of paper comprising the steps of:

adding components comprising a temperature-activated polysilicic acid and a cationic polymer to an aqueous fiber pulp suspension; and, carrying out sheet formation and water removal.

The fiber pulp used in the suspensions of the present invention may be derived from any fibrous raw materials including hardwood, softwood, nonwood, straw, bamboo, hemp or recycled paper, board, or mixtures from different fibrous raw materials. Moreover, the fibers may be obtained by any process known to those skilled in the papermaking art including mechanical or chemical pulping such as refiner groundwood, kraft pulping, sulfite pulping or mixtures of pulp obtained from different methods.

Cationic polymers useful in the present invention include cationic starches, cationic guars and cationic polyacrylamides. Cationic starches are particularly useful in that they are inexpensive and impart dry strength to the paper. The amount of cationic polymer to be added to the fiber pulp suspension is preferably about 0.005 to about 5 wt. % calculated from dry fiber.

The amount of temperature-activated polysilicic acid and cationic polymer used in the process for paper production according to the present invention can vary within wide limits depending among other things on the type of stock, the presence of fillers and other conditions. The amount of temperature-activated polysilicic acid, calculated as $SiO_2$, that may be added to the fiber pulp suspension is about 0.005–10 weight percent, more preferably about 0.05–5 weight %, calculated from dry fiber.

Additional materials may be added to the pulp to improve the properties of paper for particular uses. Examples of such additional materials include dyes which may be added to produce colored paper; fillers such as kaolin or other clays, calcium carbonate, silicon dioxide, synthetic silicates or titanium dioxide may be added to increase the density of the sheet, to decrease its porosity, and to increase its opacity. Wax may be impregnated into the paper, or a polyethylene or other polymer film may be applied to the surface, for water proofing. Bentonite may be added to the fiber pulp suspension before the water removal stage to further improve retention in the system.

While the present invention is disclosed generally above, preferred embodiments are further discussed and illustrated with reference to the examples below. However, the following examples are presented to illustrate the invention and should not be considered as limitations.

EXAMPLE 1

In this example, a temperature-activated polysilicic acid according to the present invention is prepared.

60 ml of 3.3 MR (molar ratio) sodium silicate solution was diluted with 290 ml of deionized water. The 3.3 MR sodium silicate was Zeopol® 33, sold by Zeofinn Oy of Finland. This solution, which had a concentration of about 6% $SiO_2$, was added slowly into a solution of 248.5 ml of deionized water and 48.5 ml of 10% sulfuric acid under strong agitation. The final silica concentration was 1.5% $SiO_2$. This solution was heated at 60° C. for 20 hours and then diluted to a silica concentration of about 0.15%. The pH of the final solution was 1.4.

EXAMPLE 2

In this example, a temperature-activated polysilicic acid agent of the present invention is prepared.

60 ml of 3.3 MR sodium silicate solution was diluted with 290 ml of deionized water. This solution, which had a silica concentration of about 6% was added slowly into a solution of 248.5 ml of deionized water and 48.5 ml of 10% sulfuric acid under strong agitation. The final silica concentration was 1.5% $SiO_2$. This solution was heated at 60° C. for 5 hours and then diluted to a silica concentration of 0.15%. The pH of the final solution was 1.4.

EXAMPLE 3

In this example, a temperature-activated polysilicic acid according to the present invention is prepared.

60 ml of 3.3 MR (molar ratio) sodium silicate solution was diluted with 290 ml of deionized water. The 3.3 MR sodium silicate was Zeopol® 33, sold by Zeofinn Oy of Finland. This solution, which had a concentration of about 6% $SiO_2$, was added slowly into a solution of 248.5 ml of deionized water and 48.5 ml of 10% sulfuric acid under strong agitation. The final silica concentration was 1.5% $SiO_2$. This solution was heated at 60° C. for 20 hours and then mixed at room temperature (23° C.) for 72 hours before it was diluted to a silica concentration of about 0.15%. The pH of the final solution was 1.4.

EXAMPLE 4

Fine Paper Trial—Comparative Tests

This example compares the performance of the temperature-activated polysilicic acid agent prepared in Example 1 and Example 2 (with starch or polyacrylamide) with that of Compozil (colloidal silica and cationic starch) and Hydrocol (bentonite and polyacrylamide).

Bleached softwood pulp was used with calcium carbonate as a filler. The calcium carbonate was Snowcal 75, sold by Omya Ltd. The pulp was received from a pulp mill in Finland as a bale and was free of chlorine (TCF-pulp). The pulp was ground in a Valley-hollander to SR-number 35 according to method SCAN-C 25:76. Laboratory handsheets were prepared as following standard SCAN methods. Filled sheets were produced to achieve a grammage of 90 g/m² at a filler level of 25%.

Fine paper machines normally use either alkyl succinic acid (ASA) or alkyl ketone dimer (AKD) to make paper hydrophobic. A level of 0.09% AKD, based oven dry pulp, was added into the ground kraft pulp slurry. In all tests, the cationic starch was added into the pulp slurry first and mixed well for 30 seconds at 600 rpm with pulp fibers and calcium carbonate in a Britt Dynamic Drainage Jar (DDJ). At 600 rpm, the effect of shear forces are minimal. The pH was adjusted to 8 with 1N sodium hydroxide before the filler and cationic retention aids were added into the pulp. Then, the rotation speed was increased to 2500 rpm for 2 minutes in order to simulate shear forces encountered in commercial papermaking.

In a two component retention system, the cationic substance is normally added before the mixing or machine chest in the backwater system of a paper machine. Just before the headbox strong shear forces caused by screens and pumps break the polymer loops between the anionic substances of the pulp slurry. The second component is then added before the headbox in order to increase retention level.

After the DDJ mixing step, pulp slurry was poured into a Noble & Woods sheet former and the pH of the water was adjusted to 8 before slurry addition. Then, the temperature-activated polysilicic acid agent prepared in Example 1 or Example 2, Compozil, or Hydrocol was added into the sheet former. One minute mixing with air bubbles in the sheet former was applied before the sheet was filtered. The grammage (SCAN-P 6:75) and ash retention (SCAN-P 5:63) levels of the prepared sheets were measured. The cationic starch was Hi-Cat 142, sold by Roquette Ltd. The cationic polyacrylamide was Hydrocol 847, sold by Allied Colloids Ltd. The bentonite was Hydrocol O, and the colloidal silica was BMA590, sold by EKA Nobel Ltd. See Table 1 for results.

TABLE 1

Chemical doses are given as % based on oven dry pulp.

| | $SiO_2$ | Grammage, g/m2 | Ash retention, % |
|---|---|---|---|
| Temperature-Activated Polysilicic Acid of Example 2 | | | |
| 1.9% Starch | | | |
| 1A | 0.02 | 82.5 | 86.5 |
| 1B | 0.05 | 82.3 | 83.5 |
| 1C | 0.13 | 84.0 | 85.5 |
| 1D | 0.22 | 81.3 | 75.9 |
| 1E | 0.43 | 85.7 | 75.8 |
| 1F | 0.54 | 79.9 | 73.4 |
| 1G | 0.72 | 83.6 | 77.2 |
| 1H | 1.08 | 83.3 | 73.9 |
| 0.8% Starch | | | |
| 1A | 0.02 | 83.8 | 84.6 |
| 1B | 0.05 | 83.8 | 86.6 |
| 1C | 0.13 | 84.3 | 86.5 |
| 1D | 0.22 | 82.0 | 75.0 |
| 1E | 0.43 | 83.4 | 71.6 |
| 1F | 0.54 | 83.1 | 72.9 |
| 1G | 0.72 | 84.2 | 71.6 |
| 1H | 1.08 | 79.8 | 84.2 |

TABLE 1-continued

Chemical doses are given as % based on oven dry pulp.

Temperature-Activated Polysilicic Acid of Example 1

1.9% Starch

| | | | |
|---|---|---|---|
| 2A | 0.02 | 83.6 | 71.6 |
| 2B | 0.05 | 88.5 | 90.3 |
| 2C | 0.13 | 89.6 | 91.6 |
| 2D | 0.22 | 90.8 | 92.2 |
| 2E | 0.43 | 88.7 | 91.0 |
| 2F | 0.54 | 87.8 | 91.5 |
| 2G | 0.72 | 89.5 | 90.7 |
| 2H | 1.08 | 88.3 | 91.3 |

0.8% starch

| | | | |
|---|---|---|---|
| 2A | 0.02 | 84.6 | 89.3 |
| 2B | 0.05 | 87.0 | 82.5 |
| 2C | 0.13 | 88.2 | 93.0 |
| 2D | 0.22 | 87.5 | 91.9 |
| 2E | 0.43 | 87.6 | 92.0 |
| 2F | 0.54 | 88.3 | 92.2 |
| 2G | 0.72 | 88.2 | 93.2 |
| 2H | 1.08 | 88.0 | 92.9 |

Compozil (colloidal silica sol + cationic starch

Blank trials

| | | | |
|---|---|---|---|
| 3A | only pulp, no filler | 61.4 | 1.30 |
| 3B | pulp and filler | 67.1 | 9.60 |

1.9% Starch

| | | | |
|---|---|---|---|
| 3C | — | 75.2 | 53.1 |
| 3D | 0.36 | 87.2 | 92.7 |
| 3E | 0.54 | 86.5 | 89.3 |
| 3F | 1.07 | 85.2 | 88.7 |

0.8% Starch

| | | | |
|---|---|---|---|
| 3G | — | 78.2 | 68.4 |
| 3H | 0.07 | 82.0 | 84.2 |
| 3I | 0.11 | 82.3 | 85.2 |
| 3J | 0.22 | 81.9 | 87.1 |

| | Bentonite | Polyacrylamide | Grammage, g/m2 | Ash retention, % |
|---|---|---|---|---|

Hydrocol (polyacrylamide and bentonite)

| | | | | |
|---|---|---|---|---|
| 4A | 0.27 | 0.018 | 75.8 | 50.9 |
| 4B | 0.27 | 0.027 | 76.7 | 60.2 |
| 4C | 0.27 | 0.036 | 77.4 | 64.7 |
| 4D | 0.27 | 0.120 | 86.4 | 96.0 |
| 4E | 0.54 | 0.045 | 79.7 | 72.9 |
| 4F | 0.54 | 0.090 | 83.2 | 88.8 |
| 4G | 0.54 | 0.120 | 84.3 | 94.0 |
| 4H | 0.72 | 0.120 | 84.1 | 91.4 |
| 4I | — | 0.027 | 72.2 | 47.8 |
| 4J | — | 0.090 | 77.1 | 65.4 |
| 4K | — | 0.120 | 77.7 | 71.8 |

| | $SiO_2$ | Polyacrylamide | Grammage, g/m2 | Ash retention, % |
|---|---|---|---|---|

Temperature-Activated Polysilicic Acid of Example 2

| | | | | |
|---|---|---|---|---|
| 5A | 0.02 | 0.120 | 79.8 | 77.6 |
| 5B | 0.05 | 0.120 | 82.4 | 80.3 |
| 5C | 0.13 | 0.120 | 83.9 | 82.3 |
| 5D | 0.22 | 0.120 | 88.5 | 83.8 |
| 5E | 0.43 | 0.120 | 83.7 | 77.6 |
| 5F | 0.54 | 0.120 | 83.2 | 76.3 |
| 5G | 0.72 | 0.120 | 85.5 | 76.3 |
| 5H | 1.08 | 0.120 | 84.8 | 77.9 |

Temperature-Activated Polysilicic Acid of Example 1

| | | | | |
|---|---|---|---|---|
| 6A | 0.02 | 0.120 | 86.2 | 88.0 |
| 6B | 0.05 | 0.120 | 87.2 | 91.6 |
| 6C | 0.13 | 0.120 | 87.8 | 92.1 |
| 6D | 0.22 | 0.120 | 87.7 | 93.7 |
| 6E | 0.43 | 0.120 | 86.9 | 88.3 |
| 6F | 0.54 | 0.120 | 88.7 | 92.4 |
| 6G | 0.72 | 0.120 | 88.6 | 92.6 |
| 6H | 1.08 | 0.120 | 87.5 | 91.8 |

The temperature-activated polysilicic acid of Example 1 showed a significant improvement over Compozil and Hydrocol. The temperature-activated polysilicic acid of Example 2 showed comparable performance to Compozil and Hydrocol.

EXAMPLE 5

Fine Paper Trial

This example describes the effects of heating on the temperature-activated polysilicic acid of the present invention and compares the temperature-activated polysilicic acid with polysilicic acid.

The temperature-activated polysilicic acid was prepared according to Example 1.

The non-temperature-activated polysilicic acid was prepared by diluting 60 ml of 3.3 MR sodium silicate solution with 290 ml of deionized water. This solution, which had a silica concentration of about 6% was added slowly into a solution of 248.5 ml of deionized water and 48.5 ml of 10% sulfuric acid under strong agitation. The final silica concentration was 1.5%. The solution was not heated, but was stirred at room temperature for 20 hours and then diluted to a 0.15% $SiO_2$ concentration. The pH of the final solution was 1.4.

The polysilicic acid was prepared by adding a thin stream of sodium silicate solution with a $SiO_2:Na_2O$ ratio of 3.25:1.0 into the vortex of a violently stirred solution of $H_2SO_4$ kept at 0°–5° C., stopping the addition when the pH rose to about 1.7. A 6% solution was made by bringing together solutions of sodium silicate and acid in a zone of intense turbulence and in such proportions that the mixture had a pH about 1.5–2.0. This solution was immediately diluted after preparation to obtain a 0.15% $SiO_2$ concentration. Handsheets were produced using the laboratory sheet making procedure is as described in Example 3. See Table 2 for results.

TABLE 2

| % Starch | $SiO_2$ | Grammage, g/m2 | Ash retention, % |
|---|---|---|---|

Temperature-Activated Polysilicic Acid of Example 1

0.8% Starch

| | | | |
|---|---|---|---|
| 1A | 0.09 | 89.0 | 91.1 |
| 1B | 0.18 | 86.6 | 89.4 |
| 1C | 0.27 | 85.7 | 84.6 |

Non-Temperature-Activated Polysilicic Acid 0.8% Starch

| | | | |
|---|---|---|---|
| 2A | 0.09 | 79.9 | 61.9 |
| 2B | 0.18 | 80.6 | 62.6 |
| 2C | 0.27 | 80.5 | 58.7 |

TABLE 2-continued

| % Starch | SiO₂ | Grammage, g/m2 | Ash retention, % |
|---|---|---|---|
| Polysilicic Acid | | | |
| 0.8%. Starch | | | |
| 3A | 0.09 | 75.0 | 56.8 |
| 3B | 0.18 | 73.1 | 57.7 |
| 3C | 0.27 | 75.3 | 60.1 |

The temperature-activated polysilicic acid which was prepared by heating at 60° C. for 20 hours showed a significant improvement in grammage and ash retention over both the unheated product and polysilicic acid.

EXAMPLE 6

Fine Paper Trial

This example compares the performance of the temperature-activated polysilicic acid prepared in Example 1 (with starch) with that of a polysilicate microgel and Compozil (colloidal silica and cationic starch). The polysilicate microgel was prepared in accordance with the description in Moffett, R. H., On-site Production of a Silica Based Microparticulate Retention and Drainage Aid. Papermakers Conference, Book 1, San Francisco, Calif., Marriott, 1994, pp. 243–255. The polysilicate microgel was prepared by adding diluted sulfuric acid to diluted 3.3 MR sodium silicate with vigorous mixing to obtain a final silica concentration of 2% and a pH of 9. The solution was then mixed for ten minutes at room temperature. Then, the solution was diluted to a 0.15% silica concentration with deionized water. Handsheets were produced using the laboratory sheet making procedure was as described in Example 3. See Table 3 for results.

TABLE 3

| % Starch | SiO₂ | Grammage, g/m2 | Ash retention, % |
|---|---|---|---|
| Temperature Activated polysilicic acid of Example 1 | | | |
| 0.8% Starch | | | |
| 1A | — | 80.7 | 60.6 |
| 1B | 0.036 | 85.2 | 79.6 |
| 1C | 0.090 | 85.5 | 85.1 |
| 1D | 0.13 | 89.3 | 91.5 |
| 1E | 0.18 | 88.4 | 90.3 |
| 1F | 0.23 | 87.2 | 92.5 |
| 1G | 0.27 | 86.1 | 88.1 |
| 1H | 0.36 | 85.5 | 84.5 |
| 1I | 0.45 | 84.0 | 84.9 |
| 1J | 0.54 | 82.7 | 82.8 |
| 1K | 0.63 | 85.1 | 81.9 |
| Polysilicate Microgel | | | |
| 2A | 0.036 | 82.9 | 84.8 |
| 2B | 0.090 | 83.5 | 87.5 |
| 2C | 0.13 | 83.7 | 87.5 |
| 2D | 0.18 | 84.3 | 89.5 |
| 2E | 0.23 | 83.4 | 90.5 |
| 2F | 0.27 | 83.3 | 91.4 |
| 2G | 0.36 | 86.3 | 91.6 |
| 2H | 0.45 | 86.3 | 91.8 |
| 2I | 0.54 | 85.7 | 90.3 |
| 2J | 0.63 | 84.3 | 89.3 |

TABLE 3-continued

| % Starch | SiO₂ | Grammage, g/m2 | Ash retention, % |
|---|---|---|---|
| Compozil (colloidal silica and cationic starch) | | | |
| 0.8% Starch | | | |
| 3A | only pulp, no filler, no starch | 69.0 | 1.1 |
| 3B | pulp and filler, no starch | 69.7 | 10.5 |
| 3C | 0.07 | 86.2 | 83.7 |
| 3D | 0.14 | 84.7 | 80.3 |
| 3E | 0.18 | 86.4 | 80.5 |
| 3F | 0.23 | 85.3 | 82.6 |
| 3G | 0.27 | 87.5 | 83.9 |
| 3H | 0.36 | 84.9 | 83.0 |
| 3I | 0.45 | 86.5 | 83.6 |
| 3J | 0.54 | 84.5 | 84.2 |
| 3K | 0.63 | 85.4 | 84.4 |

The temperature-activated polysilicic acid of Example 1 showed comparable performance to the polysilicate microgel and Compozil.

EXAMPLE 7

Wood Containing Paper Trial—Comparative Tests

This example compares the performance of four products: the temperature-activated polysilicic acid of Example 1, the temperature-activated polysilicic acid of Example 3, Compozil (colloidal silica and cationic starch) and Hydrocol (bentonite and polyacrylamide).

Unbleached groundwood pulp was used with kaolin. The kaolin was C kaolin, sold by ECC International. The pulp was received from a Finnish pulp mill as a bale. The groundwood pulp was hot-disintegrated to eliminate the latency of pulp, according to method SCAN-M 10:77.

Laboratory handsheets were prepared as follows, to achieve a 90 g/m² sheet containing 25% kaolin filler.

Wood containing paper machines typically may not use hydrophobic agents. Accordingly, AKD and ASA glues were not used in this example. In all tests, the cationic substance (starch or polyacrylamide) was added into the pulp slurry first and mixed well for 30 seconds at 600 rpm with pulp fibers and kaolin in a Britt Drainage Jar. At 600 rpm, the effect of shear forces are minimal. The pH was adjusted to 5 with 1N sulfuric acid before the filler and cationic retention aids were added to the pulp. Then, the rotation speed was increased to 2500 rpm for 2 minutes in order to simulate shear forces encountered in commercial papermaking.

In a two component retention system, the cationic substance is normally added before the mixing or machine chest in the backwater system of a paper machine. Just before the headbox, strong shear forces caused by screens and pumps break the polymer loops between the anionic substances of the pulp slurry. The second component is then added before the headbox in order to increase retention level.

After the DDJ mixing step, pulp slurry was poured into a Noble & Woods sheet former and the pH of the water was adjusted to 5 before slurry addition. Then, the temperature-activated polysilicic acid agent prepared in Example 1 or Example 2, Compozil, or Hydrocol was added into the sheet former before filtration took place after 1 minute of mixing with air bubbles in the sheet former was applied before the sheet was filtered. The grammage (SCAN-P 6:75) and ash retention (SCAN-P 5:63) levels of the prepared sheets were measured. See Table 4 for results.

TABLE 4

Chemical doses are given as % based on oven dry pulp.

| | SiO$_2$ | Grammage, g/m2 | Ash retention, % |
|---|---|---|---|
| Temperature-Activated Polysilicic Acid of Example 3 | | | |
| 0.8% Starch | | | |
| 1A | — | 72.1 | 51.3 |
| 1B | 0.04 | 74.3 | 57.4 |
| 1C | 0.09 | 78.2 | 68.1 |
| 1D | 0.13 | 78.7 | 67.2 |
| 1E | 0.18 | 76.8 | 66.3 |
| 1F | 0.23 | 78.8 | 70.4 |
| 1G | 0.27 | 82.1 | 77.1 |
| 1H | 0.36 | 76.9 | 68.3 |
| 1I | 0.45 | 76.0 | 63.4 |
| 1K | 0.54 | 74.7 | 64.1 |
| 1J | 0.63 | 72.2 | 61.9 |

| | SiO$_2$ | Polyacrylamide | Grammage, g/m2 | Ash retention, % |
|---|---|---|---|---|
| Temperature-Activated Polysilicic Acid of Example 1 | | | | |
| 2A | — | 0.018 | 72.7 | 42.1 |
| 2B | 0.04 | 0.018 | 70.7 | 38.3 |
| 2C | 0.09 | 0.018 | 71.8 | 37.7 |
| 2D | 0.13 | 0.018 | 72.3 | 38.8 |
| 2E | 0.18 | 0.018 | 71.1 | 38.8 |
| 2F | 0.23 | 0.018 | 72.2 | 38.9 |
| 2G | 0.27 | 0.018 | 70.2 | 37.5 |
| 2H | 0.36 | 0.018 | 69.3 | 37.7 |
| 2I | 0.45 | 0.018 | 67.1 | 40.8 |
| 2J | 0.54 | 0.018 | 67.0 | 39.0 |
| 2K | 0.63 | 0.018 | 66.7 | 40.9 |
| 2L | 0.09 | 0.036 | 72.8 | 42.5 |
| 2M | 0.18 | 0.036 | 71.0 | 41.0 |
| 2N | 0.36 | 0.036 | 71.4 | 42.9 |
| 2O | 0.54 | 0.036 | 70.0 | 42.1 |
| Compozil (Silica sol and polyacrylamide) | | | | |
| 3A | — | 0.036 | 70.4 | 42.2 |
| 3B | 0.04 | 0.018 | 70.0 | 40.5 |
| 3C | 0.09 | 0.018 | 68.7 | 38.3 |
| 3D | 0.13 | 0.018 | 68.1 | 38.2 |
| 3E | 0.18 | 0.018 | 66.9 | 36.5 |
| 3F | 0.23 | 0.018 | 67.0 | 37.1 |
| 3G | 0.27 | 0.018 | 68.0 | 37.4 |
| 3H | 0.36 | 0.018 | 79.2 | 36.4 |
| 3I | 0.45 | 0.018 | 79.7 | 41.2 |
| 3J | 0.54 | 0.018 | 78.5 | 38.5 |
| 3K | 0.63 | 0.018 | 68.7 | 39.5 |
| 3L | 0.09 | 0.036 | 69.1 | 40.0 |
| 3M | 0.18 | 0.036 | 69.8 | 41.6 |
| 3N | 0.36 | 0.036 | 70.7 | 45.4 |
| 3O | 0.54 | 0.036 | 65.1 | 30.2 |
| 3P | fibers plus kaolin | — | 62.3 | 8.4 |
| 3Q | only fibers | — | 53.9 | 0.3 |

| | Bentonite | Polyacrylamide | Grammage, g/m2 | Ash retention, % |
|---|---|---|---|---|
| Hydrocol (polyacrylamide and bentonite) | | | | |
| 4A | — | 0.018 | 65.0 | 37.2 |
| 4B | 0.27 | 0.009 | 65.6 | 39.5 |
| 4C | 0.27 | 0.018 | 68.7 | 41.7 |
| 4D | 0.27 | 0.036 | 70.1 | 46.6 |
| 4E | — | 0.009 | 66.4 | 34.8 |
| 4F | 0.54 | 0.009 | 69.3 | 40.9 |
| 4G | 0.54 | 0.018 | 70.1 | 47.2 |
| 4H | 0.54 | 0.036 | 70.5 | 42.9 |

In this groundwood paper trial the temperature-activated polysilicic acid of Example 3 showed a significant improvement in grammage and ash retention levels over the temperature-activated polysilicic acid agent of Example 1, in which the solution was not mixed at room temperature before dilution, Compozil (colloidal silica and cationic starch) and Hydrocol (bentonite and polyacrylamide).

EXAMPLE 8

This example compares the performance of a temperature-activated polysilicic acid of the present invention with a colloidal silica.

For the comparative tests, Canadian Standard Freeness measurements were made according to SCAN-C 21:65. The amount of pulp and filler added into the DDJ and the handling procedure of the slurry was as described previously in Example 3. However, after mixing at 2500 rpm for 2 minutes, the speed was reduced to 600 rpm for 1 minute, when the silica dosage was added into the slurry before the freeness measurements. The cationic starch was added at a constant dosage of 0.8% based on oven dry pulp. The results are shown in Table 5.

TABLE 5

DRAINAGE MEASUREMENTS
Freeness

| % SiO$_2$ | Colloidal Silica | Temperature-Activated Polysilicic Acid |
|---|---|---|
| 0.05 | 450 | 420 |
| 0.13 | 550 | 570 |
| 0.22 | 530 | 610 |
| 0.43 | 490 | 580 |

It may be seen from Table 5 that the temperature-activated polysilicic acid agent of the present invention showed activity at least as good as the colloidal silica and a somewhat enhanced activity at dosages of 0.13, 0.22, and 0.43% SiO$_2$.

It will be understood that various details of the invention can be changed without departing from the scope of the invention. Furthermore, the foregoing description is for the purpose of illustration only, and not for the purpose of limitation—the invention is defined by the claims.

I claim:

1. A process for the production of paper comprising the steps of:

adding components comprising a temperature-activated polysilicic acid having a specific surface area of at least about 1350 m$^2$/g and a cationic polymer to an aqueous fiber pulp suspension, said components being added in an amount to enhance at least one paper/paper processing characteristic selected from the group consisting of filler retention, water removal, paper mechanical properties, fine and colloid recovery, and filterability; and, carrying out sheet formation and water removal; wherein the temperature-activated polysilicic acid is produced by a process comprising the steps of heating an acidified aqueous alkali metal silicate at a temperature of about 30° to 250° C. at a pH of about 0 to 5.

2. The process of claim 1, wherein the aqueous fiber pulp suspension contains a filler.

3. The process of claim 1, wherein the temperature-activated polysilicic acid has a pH of about 0 to 2.

4. The process of claim 1, wherein the acidified aqueous alkali metal silicate is prepared by slow addition of a diluted alkali metal silicate solution into a mineral acid.

5. The process of claim 4, wherein the mineral acid is selected from the group consisting of sulfuric acid, hydrochloric acid or phosphoric acid.

6. The process of claim 1 wherein the aqueous alkali metal silicate is acidified by slow addition of a diluted alkali metal silicate solution into an ion exchange agent or an organic acid such as acetic acid.

7. The process of claim 5, wherein the aqueous alkali metal silicate is sodium silicate.

8. The process of claim 1, wherein the acidified aqueous alkali metal silicate is heated at a temperature of about 30° to 250° C. for about 1 to 120 hours.

9. The process of claim 8, wherein the acidified aqueous alkali metal silicate is heated at a temperature of 60° C. for 20 hours.

10. The process of claim 1, wherein the acidified aqueous alkali metal silicate is heated under pressure necessary to achieve a desired temperature.

11. The process of claim 1, wherein the heated and acidified aqueous alkali metal silicate is mixed at room temperature and diluted.

12. The process of claim 11, wherein the heated and acidified aqueous alkali metal silicate is subsequently mixed at room temperature for 72 hours and diluted to 0.15% $SiO_2$.

13. The process of claim 1, wherein the temperature-activated polysilicic acid has a specific surface area of about 1350 to 1600 $m^2/g$.

14. The process of claim 1, wherein the cationic polymer is selected from the group consisting of starch, polyacrylamide, guar gum, or a mixture thereof.

15. The process of claim 1, wherein the temperature-activated polysilicic acid is added to the suspension in an amount of from about 0.05–5 wt. % based on dry weight of the fiber.

16. The process of claim 1, wherein the cationic polymer is added to the suspension in an amount of from about 0.005–5 wt. % based on dry weight of the fiber.

17. A paper product produced according to the process of claim 1.

18. A method for improving retention in a papermaking process wherein a temperature-activated polysilicic acid having a specific surface area of at least about 1350 $m^2/g$ and a cationic polymer are added to an aqueous fiber pulp suspension, said polysilicic acid being added in an amount to enhance filler retention; wherein the temperature-activated polysilicic acid is produced by a process comprising the steps of heating an acidified aqueous alkali metal silicate at a temperature of about 30° to 250° C. at a pH of about 0 to 5.

19. The method of claim 18, wherein the acidified aqueous alkali metal silicate is heated with secondary heat from a paper mill.

20. The method of claim 18, wherein the temperature-activated polysilicic acid has a pH of about 0 to 2.

21. The method of claim 18, wherein the acidified aqueous alkali metal silicate is prepared by slow addition of a diluted alkali metal silicate solution into a mineral acid.

22. The method of claim 21, wherein the mineral acid is selected from the group consisting of sulfuric acid, hydrochloric acid or phosphoric acid.

23. The process of claim 18, wherein the aqueous alkali metal silicate is acidified by slow addition of a diluted alkali metal silicate solution into an ion exchange agent or an organic acid such as acetic acid.

24. The method of claim 22, wherein the aqueous alkali metal silicate is sodium silicate.

25. The method of claim 18, wherein the acidified aqueous alkali metal silicate is heated at a temperature of about 30° to 250° C. for about 1 to 120 hours.

26. The method of claim 25, wherein the acidified aqueous alkali metal silicate is heated at a temperature of 60° C. for 20 hours.

27. The method of claim 18, wherein the acidified aqueous alkali metal silicate is heated under pressure necessary to achieve a desired temperature.

28. The method of claim 18, wherein the heated and acidified aqueous alkali metal silicate is mixed at room temperature and diluted.

29. The method of claim 28, wherein the heated and acidified aqueous alkali metal silicate is subsequently mixed at room temperature for 72 hours and diluted to 0.15% $SiO_2$.

30. The method of claim 18, wherein the temperature-activated polysilicic acid has a specific surface area of about 1350 to 1600 $m^2/g$.

31. The method of claim 18, wherein the temperature-activated polysilicic acid is added to the suspension in an amount of from about 0.05–5 wt. % based on dry weight of the fiber.

32. A paper product produced according to the method of claim 18.

* * * * *